(12) United States Patent
Thompson et al.

(10) Patent No.: US 8,872,772 B2
(45) Date of Patent: Oct. 28, 2014

(54) INTERACTIVE INPUT SYSTEM AND PEN TOOL THEREFOR

(75) Inventors: Sean Thompson, Calgary (CA); Grant McGibney, Calgary (CA); David Holmgren, Calgary (CA)

(73) Assignee: SMART Technologies ULC (CA)

( * ) Notice: Subject to any disclaimer, the term of this patent is extended or adjusted under 35 U.S.C. 154(b) by 774 days.

(21) Appl. No.: 12/752,915

(22) Filed: Apr. 1, 2010

(65) Prior Publication Data

US 2011/0242006 A1   Oct. 6, 2011

(51) Int. Cl.
*G06F 3/041* (2006.01)
*G06F 3/042* (2006.01)
*G06F 3/0354* (2013.01)

(52) U.S. Cl.
CPC .......... *G06F 3/0428* (2013.01); *G06F 3/03545* (2013.01)
USPC .......... 345/173; 345/175; 345/179; 345/158; 345/178; 345/180; 250/221; 178/18.09; 178/18.01; 178/18.03; 178/19.01

(58) Field of Classification Search
None
See application file for complete search history.

(56) References Cited

U.S. PATENT DOCUMENTS

| | | | |
|---|---|---|---|
| 5,448,263 A | 9/1995 | Martin | |
| 6,141,000 A | 10/2000 | Martin | |
| 6,337,681 B1 | 1/2002 | Martin | |
| 6,421,042 B1 * | 7/2002 | Omura et al. | 345/157 |
| 6,747,636 B2 | 6/2004 | Martin | |
| 6,803,906 B1 * | 10/2004 | Morrison et al. | 345/173 |
| 6,833,481 B2 | 12/2004 | Yamamoto et al. | |
| 6,972,401 B2 | 12/2005 | Akitt et al. | |
| 7,202,860 B2 | 4/2007 | Ogawa | |
| 7,232,986 B2 | 6/2007 | Worthington et al. | |
| 7,236,162 B2 | 6/2007 | Morrison et al. | |
| 7,274,356 B2 | 9/2007 | Ung et al. | |
| 7,414,617 B2 | 8/2008 | Ogawa | |
| 2001/0022579 A1 * | 9/2001 | Hirabayashi | 345/175 |
| 2004/0179001 A1 | 9/2004 | Morrison et al. | |
| 2005/0178953 A1 * | 8/2005 | Worthington et al. | 250/221 |
| 2005/0243070 A1 * | 11/2005 | Ung et al. | 345/176 |
| 2006/0028457 A1 * | 2/2006 | Burns | 345/179 |
| 2009/0277694 A1 | 11/2009 | Hansen et al. | |
| 2009/0278794 A1 | 11/2009 | McReynolds et al. | |
| 2011/0170253 A1 | 7/2011 | Liu et al. | |

FOREIGN PATENT DOCUMENTS

WO   01/63550 A2   8/2001
WO   2006/121847 A2   11/2006

(Continued)

OTHER PUBLICATIONS

Transmittal; International Search Report; and Written Opinion of the International Searching Authority for International Application No. PCT/CA2011/000338, with a mailing date of Jul. 14, 2011.
U.S. Appl. No. 61/294,832, filed Jan. 14, 2010, entitled "Interactive Input System and Illumination System Therefor" to McGibney.

*Primary Examiner* — Jesus Hernandez
(74) *Attorney, Agent, or Firm* — Katten Muchin Rosenman LLP

(57) ABSTRACT

A pen tool for use with a machine vision interactive input system comprises an elongate body and a tip arrangement at one end of the body, an end surface of the body at least partially about the tip arrangement carrying light reflective material that is visible to at least one imaging assembly of the interactive input system when the pen tool is angled.

10 Claims, 15 Drawing Sheets

(56) References Cited

FOREIGN PATENT DOCUMENTS

| WO | 2007079590 A1 | 7/2007 |
|---|---|---|
| WO | 2009/033265 A1 | 3/2009 |
| WO | 2009135313 A1 | 11/2009 |
| WO | 2009135318 A1 | 11/2009 |
| WO | 2010028490 A1 | 3/2010 |

* cited by examiner

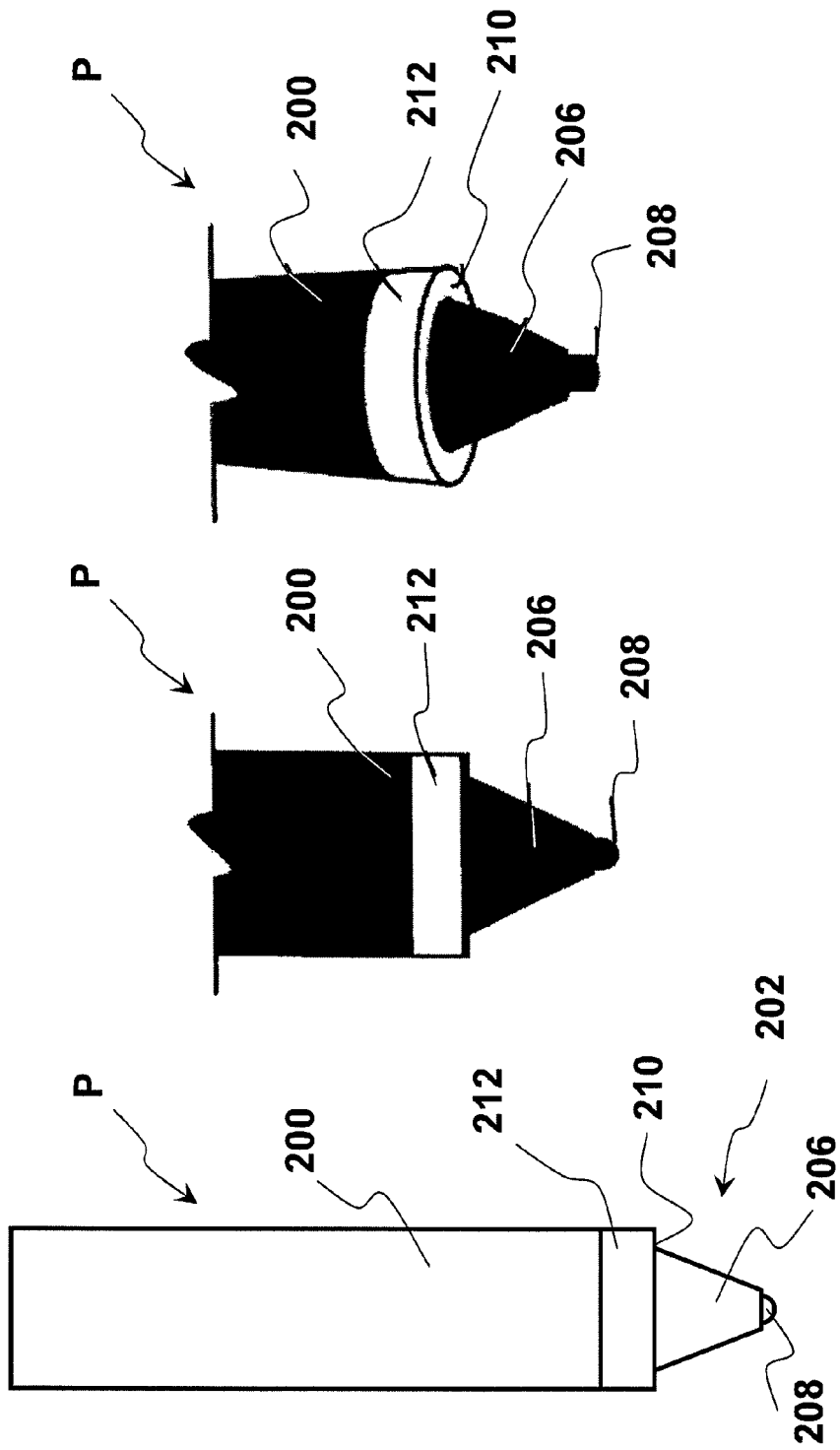

Image frame

INTERACTIVE INPUT SYSTEM AND PEN TOOL THEREFOR

FIELD OF THE INVENTION

The present invention relates to an interactive input system and to a pen tool therefor.

BACKGROUND OF THE INVENTION

Interactive input systems that allow users to inject input into an application program using an active pointer (eg. a pointer that emits light, sound or other signal), a passive pointer (eg. a finger, cylinder or other object) or other suitable input device such as for example, a mouse or trackball, are well known. These interactive input systems include but are not limited to: touch systems comprising touch panels employing analog resistive or machine vision technology to register pointer input such as those disclosed in U.S. Pat. Nos. 5,448,263; 6,141,000; 6,337,681; 6,747,636; 6,803,906; 7,232,986; 7,236,162; and 7,274,356 and in U.S. Patent Application Publication No. 2004/0179001 assigned to SMART Technologies ULC of Calgary, Alberta, Canada, assignee of the subject application, the contents of which are incorporated by reference; touch systems comprising touch panels employing electromagnetic, capacitive, acoustic or other technologies to register pointer input; tablet personal computers (PCs); laptop PCs; personal digital assistants (PDAs); and other similar devices.

Above-incorporated U.S. Pat. No. 6,803,906 to Morrison et al. discloses a touch system that employs machine vision to detect pointer interaction with a touch surface on which a computer-generated image is presented. A rectangular bezel or frame surrounds the touch surface and supports digital cameras at its corners. The digital cameras have overlapping fields of view that encompass and look generally across the touch surface. The digital cameras acquire images looking across the touch surface from different vantages and generate image data. Image data acquired by the digital cameras is processed by on-board digital signal processors to determine if a pointer exists in the captured image data. When it is determined that a pointer exists in the captured image data, the digital signal processors convey pointer characteristic data to a master controller, which in turn processes the pointer characteristic data to determine the location of the pointer in (x,y) coordinates relative to the touch surface using triangulation. The pointer coordinates are conveyed to a computer executing one or more application programs. The computer uses the pointer coordinates to update the computer-generated image that is presented on the touch surface. Pointer contacts on the touch surface can therefore be recorded as writing or drawing or used to control execution of application programs executed by the computer.

U.S. Pat. No. 6,972,401 to Akitt et al. assigned to SMART Technologies ULC, the content of which is incorporated herein by reference in its entirety, discloses an illuminated bezel for use in a touch system such as that disclosed in above-incorporated U.S. Pat. No. 6,803,906 to Morrison et al. The illuminated bezel comprises infrared (IR) light emitting diodes (LEDs) that project infrared light onto diffusers. The diffusers in turn, diffuse the infrared light so that the intensity of backlighting provided over the touch surface by the illuminated bezel is generally even across the surfaces of the diffusers. As a result, the backlight illumination provided by the bezel appears generally continuous to the digital cameras. Although this illuminated bezel works very well, it adds cost to the touch system.

U.S. Pat. No. 6,823,481 to Takekawa discloses a coordinate input/detection device comprising left and right optical units positioned at the bottom corners of a coordinate input/detection area. Retro reflectors are provided along the upper, left and right sides of the coordinate input/detection area. A pen tool having a body that tapers adjacent one end towards a tip can be used with the coordinate input/detection device. The tapered portion of the pen tool body has a retro reflector thereon.

U.S. Pat. Nos. 7,202,860 and 7,414,617 to Ogawa discloses a camera-based coordinate input device allowing coordinate input using a pointer or finger. The coordinate input device comprises a pair of cameras positioned at the upper left and upper right corners of a display screen. The field of view of each camera extends to a diagonally opposite corner of the display screen in parallel with the display screen. Infrared light emitting diodes are arranged close to the imaging lens of each camera and illuminate the surrounding area of the display screen. An outline frame is provided on three sides of the display screen. A narrow-width retro-reflection tape is arranged near the display screen on the outline frame. A non-reflective black tape is attached to the outline frame along and in contact with the retro-reflection tape. A control circuit calculates the coordinate value of a pen tool, pointing to a position within a coordinate detection field, based on video signals output from the cameras and transfers the coordinate value to a computer. The pen tool is a pen having a pen tip member at one end of a pen body. The pen body tapers near the pen tip member. The tapering portion of the pen tip body is surrounded by retro-reflection tape.

In these interactive input systems, depending on the orientation of the pen tool brought towards the input surface, it can be difficult to distinguish between a finger brought into contact with the input surface and the pen tool. If different functionalities are attributed to different types of pointers, not being able to distinguish between pointer types can be problematic.

It is therefore an object of the present invention at least to provide a novel interactive input system and a novel pen tool therefor.

SUMMARY OF THE INVENTION

Accordingly, in one aspect there is provided a pen tool for use with a machine vision interactive input system comprising an elongate body; and a tip arrangement at one end of said body, an end surface of said body at least partially about said tip arrangement carrying light reflective material that is visible to at least one imaging assembly of said interactive input system when the pen tool is angled.

According to another aspect there is provided a pen tool for use with a machine vision interactive input system comprising an elongate, generally cylindrical body; and a tip arrangement extending from one end of said body, said tip arrangement comprising a generally conical portion that narrows in a direction away from said body and a nib at the narrow end of said conical portion, wherein an end surface of said body adjacent said tip arrangement carries an annular ring of light reflective material that is visible to at least one imaging assembly of said interactive input system when the pen tool is angled.

According to another aspect there is provided a method of identifying a pointer in a machine vision interactive input system comprising a region of interest surrounded by a bezel and at least one imaging assembly having a field of view looking into said region of interest, said method comprising capturing image frames; and processing the image frames to detect the presence of a pointer and to detect the presence of a signature that is distinctive of the bezel representative of a pen tool.

According to yet another aspect there is provided an interactive input system comprising a region of interest surrounded by a bezel; at least one imaging assembly having a field of view looking into the region of interest and seeing said bezel; and processing structure processing image frames captured by said at least one imaging assembly to detect the presence of a pointer and to detect the presence of a signature that is distinctive of the bezel representative of a pen tool.

BRIEF DESCRIPTION OF THE DRAWINGS

Embodiments will now be described more fully with reference to the accompanying drawings in which:

FIG. 7A is a side elevational view of a pen tool of for use with the interactive input system of FIG. 1;

FIGS. 7B and 7C are side elevational and perspective views, respectively, of a portion of the pen tool of FIG. 7A;

DETAILED DESCRIPTION OF THE EMBODIMENTS

Figure 1:
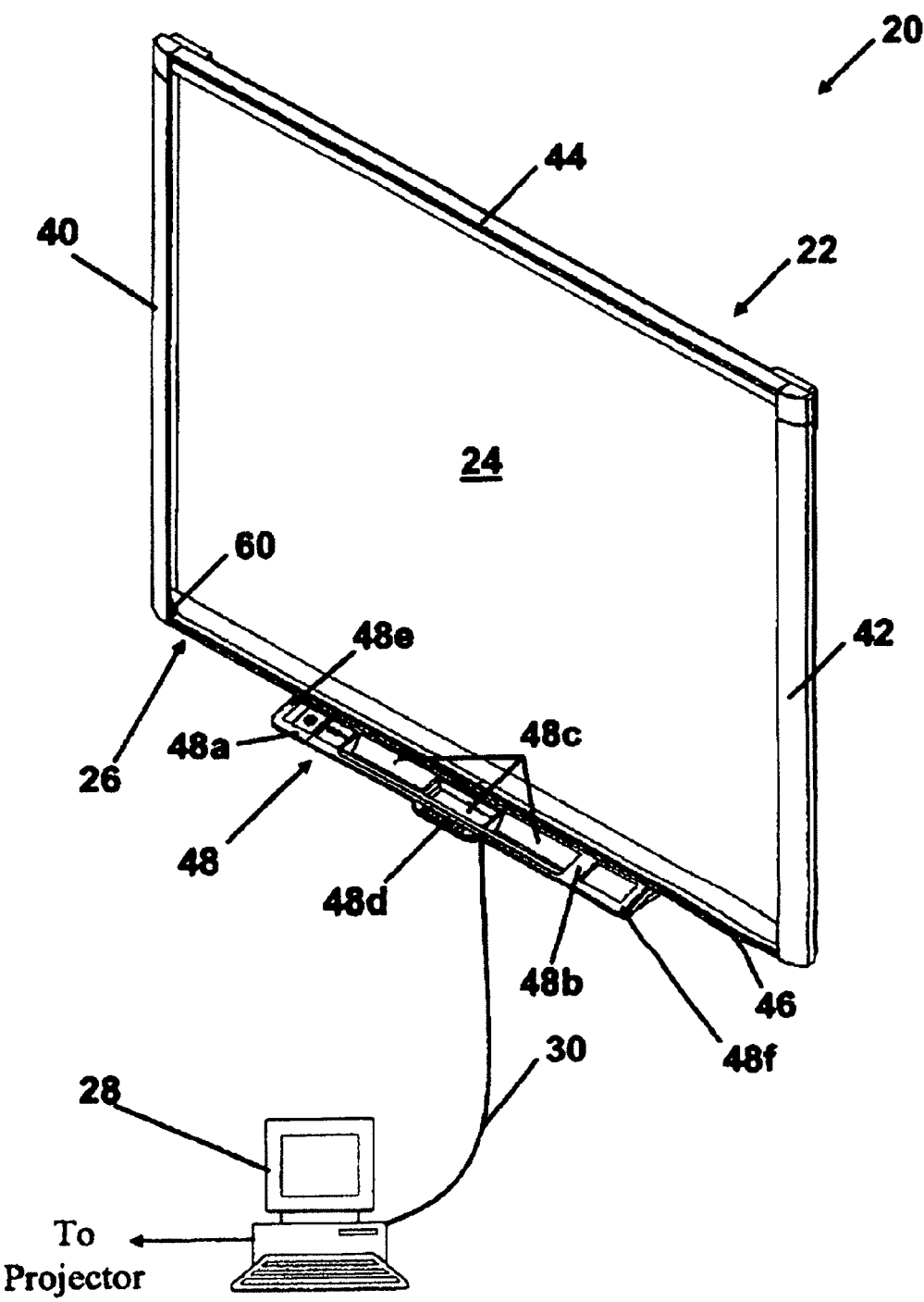
FIG. 1 is a schematic perspective view of an interactive input system.
Figure 2:
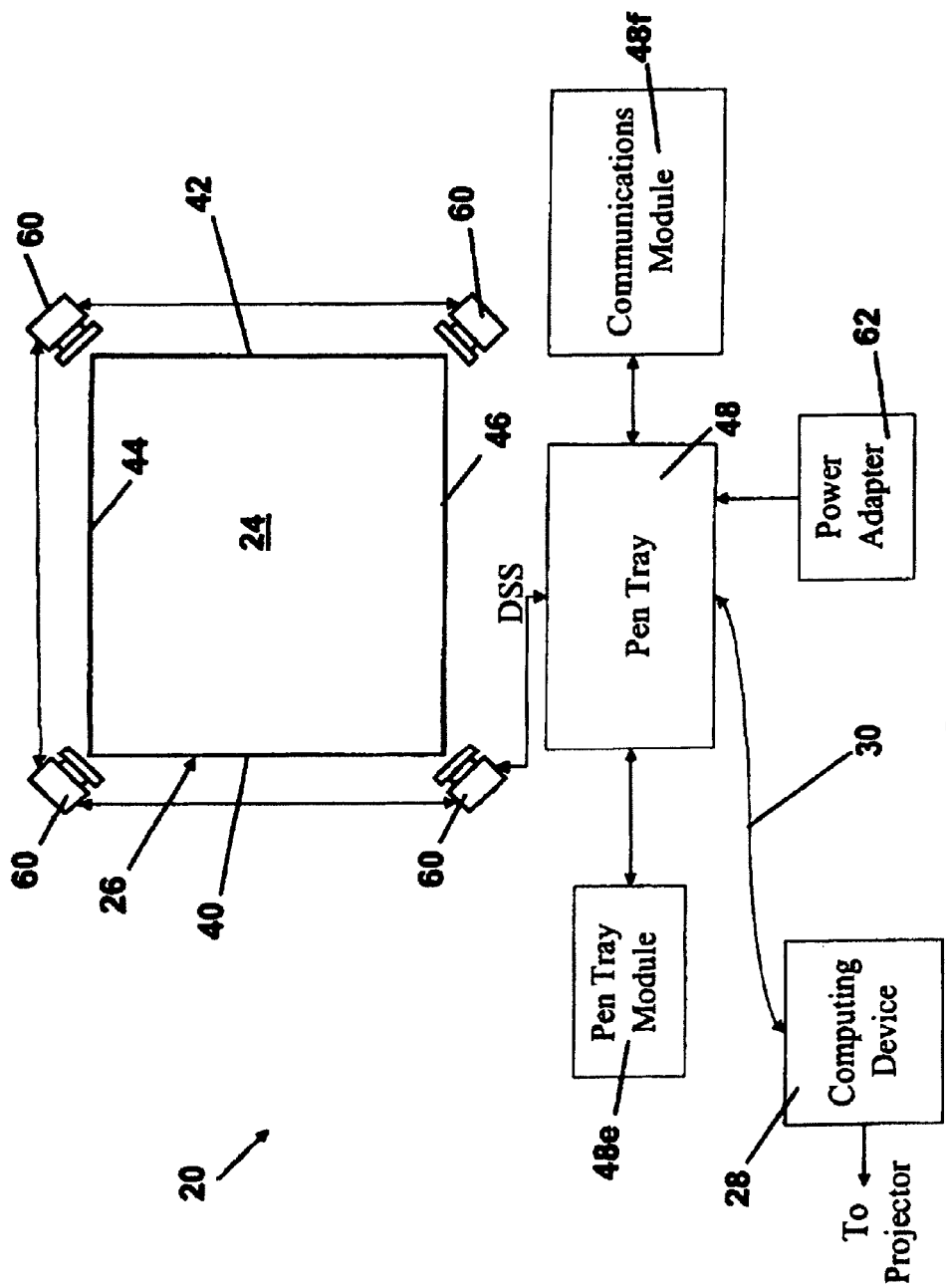
FIG. 2 is a schematic block diagram view of the interactive input system of FIG. 1.

Turning now to FIGS. 1 and 2, an interactive input system that allows a user to inject input such as digital ink, mouse events etc. into an application program executed by a computing device is shown and is generally identified by reference numeral 20. In this embodiment, interactive input system 20 comprises an interactive board 22 mounted on a vertical support surface such as for example, a wall surface or the like. Interactive board 22 comprises a generally planar, rectangular interactive surface 24 that is surrounded about its periphery by a bezel 26. An ultra-short throw projector (not shown) such as that sold by SMART Technologies ULC under the name SMART UX60 is also mounted on the support surface above the interactive board 22 and projects an image, such as for example a computer desktop, onto the interactive surface 24.

The interactive board 22 employs machine vision to detect one or more pointers brought into a region of interest in proximity with the interactive surface 24. The interactive board 22 communicates with a general purpose computing device 28 executing one or more application programs via a universal serial bus (USB) cable 30. General purpose computing device 28 processes the output of the interactive board 22 and adjusts image data that is output to the projector, if required, so that the image presented on the interactive surface 24 reflects pointer activity. In this manner, the interactive board 22, general purpose computing device 28 and projector allow pointer activity proximate to the interactive surface 24 to be recorded as writing or drawing or used to control execution of one or more application programs executed by the general purpose computing device 28.

The bezel 26 in this embodiment is mechanically fastened to the interactive surface 24 and comprises four bezel segments 40, 42, 44, 46. Bezel segments 40 and 42 extend along opposite side edges of the interactive surface 24 while bezel segments 44 and 46 extend along the top and bottom edges of the interactive surface 24 respectively. In this embodiment, the inwardly facing surface of each bezel segment 40, 42, 44 and 46 comprises a single, longitudinally extending strip or band of retro-reflective material. To take best advantage of the properties of the retro-reflective material, the bezel segments 40, 42, 44 and 46 are oriented so that their inwardly facing surfaces extend in a plane generally normal to the plane of the interactive surface 24.

A tool tray 48 is affixed to the interactive board 22 adjacent the bezel segment 46 using suitable fasteners such as for example, screws, clips, adhesive etc. As can be seen, the tool tray 48 comprises a housing 48a having an upper surface 48b configured to define a plurality of receptacles or slots 48c. The receptacles 48c are sized to receive one or more pen tools P as will be described as well as an eraser tool (not shown) that can be used to interact with the interactive surface 24. Control buttons 48d are provided on the upper surface 48b of the housing 48a to enable a user to control operation of the interactive input system 20. One end of the tool tray 48 is configured to receive a detachable tool tray accessory module 48e while the opposite end of the tool tray 48 is configured to receive a detachable communications module 48f for remote device communications. The housing 48a accommodates a master controller 50 (see FIG. 5) as will be described. Further specifics of the tool tray 48 are described in U.S. application Ser. No. 12/709,424 to Bolt et al. entitled "Interactive Input System and Pen Tool Tray Therefor" filed Feb. 19, 2010, the content of which is incorporated herein by reference in its entirety.

Imaging assemblies 60 are accommodated by the bezel 26, with each imaging assembly 60 being positioned adjacent a different corner of the bezel. The imaging assemblies 60 are oriented so that their fields of view overlap and look generally across the entire interactive surface 24. In this manner, any pointer such as for example a user's finger, a cylinder or other suitable object, or a pen tool or eraser tool lifted from a receptacle 48c of the tool tray 48, that is brought into proximity of the interactive surface 24 appears in the fields of view of the imaging assemblies 60. A power adapter 62 provides the necessary operating power to the interactive board 22 when connected to a conventional AC mains power supply.

Figure 3:
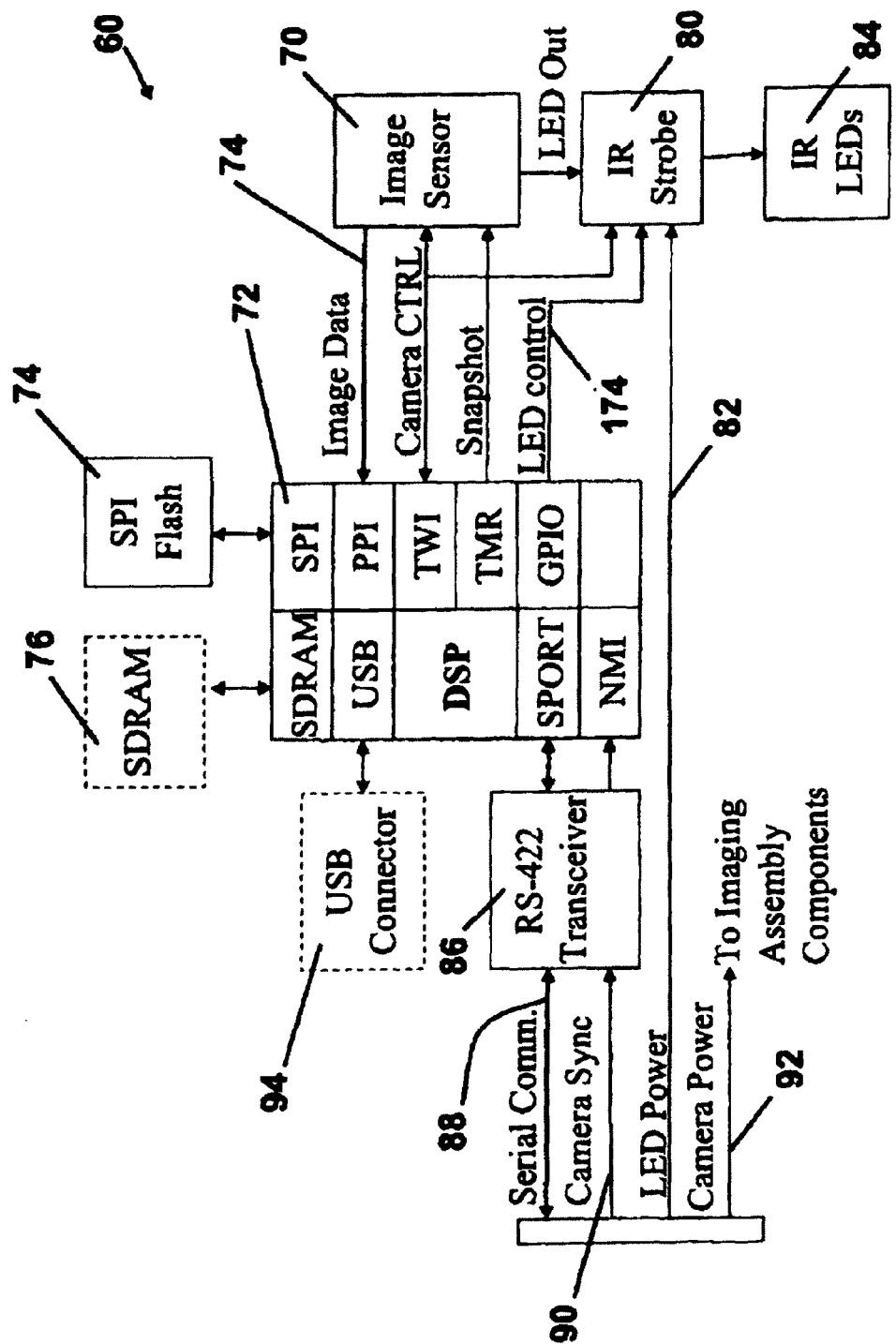
FIG. 3 is a block diagram of an imaging assembly forming part of the interactive input system of FIG. 1.

Turning now to FIG. 3, one of the imaging assemblies 60 is better illustrated. As can be seen, the imaging assembly 60 comprises an image sensor 70 such as that manufactured by Aptina (Micron) under Model No. MT9V034 having a resolution of 752×480 pixels, fitted with a two element, plastic lens (not shown) that provides the image sensor 70 with a field of view of approximately 104 degrees. In this manner, the other imaging assemblies 60 are within the field of view of the image sensor 70 thereby to ensure that the field of view of the image sensor 70 encompasses the entire interactive surface 24.

A digital signal processor (DSP) 72 such as that manufactured by Analog Devices under part number ADSP-BF522 Blackfin or other suitable processing device, communicates with the image sensor 70 over an image data bus 74 via a parallel port interface (PPI). A serial peripheral interface (SPI) flash memory 74 is connected to the DSP 72 via an SPI port and stores the firmware required for image assembly operation. Depending on the size of captured image frames as well as the processing requirements of the DSP 72, the imaging assembly 60 may optionally comprise synchronous dynamic random access memory (SDRAM) 76 to store additional temporary data as shown by the dotted lines. The image sensor 70 also communicates with the DSP 72 via a two-wire interface (TWI) and a timer (TMR) interface. The control registers of the image sensor 70 are written from the DSP 72 via the TWI in order to configure parameters of the image sensor 70 such as the integration period for the image sensor 70.

In this embodiment, the image sensor 70 operates in snapshot mode. In the snapshot mode, the image sensor 70, in response to an external trigger signal received from the DSP 72 via the TMR interface that has a duration set by a timer on the DSP 72, enters an integration period during which an image frame is captured. Following the integration period after the generation of the trigger signal by the DSP 72 has ended, the image sensor 70 enters a readout period during which time the captured image frame is available. With the image sensor in the readout period, the DSP 72 reads the image frame data acquired by the image sensor 70 over the image data bus 74 via the PPI. The frame rate of the image sensor 70 in this embodiment is between about 900 and about 960 frames per second. The DSP 72 in turn processes image frames received from the image sensor 72 and provides pointer information to the master controller 50 at a reduced rate of approximately 120 points/sec. Those of skill in the art will however appreciate that other frame rates may be employed depending on the desired accuracy of pointer tracking and whether multi-touch and/or active pointer identification is employed.

Three strobe circuits 80 communicate with the DSP 72 via the TWI and via a general purpose input/output (GPIO) interface. The IR strobe circuits 80 also communicate with the image sensor 70 and receive power provided on LED power line 82 via the power adapter 52. Each strobe circuit 80 drives a respective illumination source in the form of an infrared (IR) light emitting diode (LED) 84a to 84c that provides infrared backlighting over the interactive surface 24. Further specifics concerning the strobe circuits 80 and their operation are described in U.S. application Ser. No. 12/709,451 to Akitt entitled "Interactive Input System and Illumination System Therefor" filed on Feb. 19, 2010, the content of which is incorporated herein by reference in its entirety.

The DSP 72 also communicates with an RS-422 transceiver 86 via a serial port (SPORT) and a non-maskable interrupt (NMI) port. The transceiver 86 communicates with the master controller 50 over a differential synchronous signal (DSS) communications link 88 and a synch line 90. Power for the components of the imaging assembly 60 is provided on power line 92 by the power adapter 52. DSP 72 may also optionally be connected to a USB connector 94 via a USB port as indicated by the dotted lines. The USB connector 94 can be used to connect the imaging assembly 60 to diagnostic equipment.

Figure 4A:
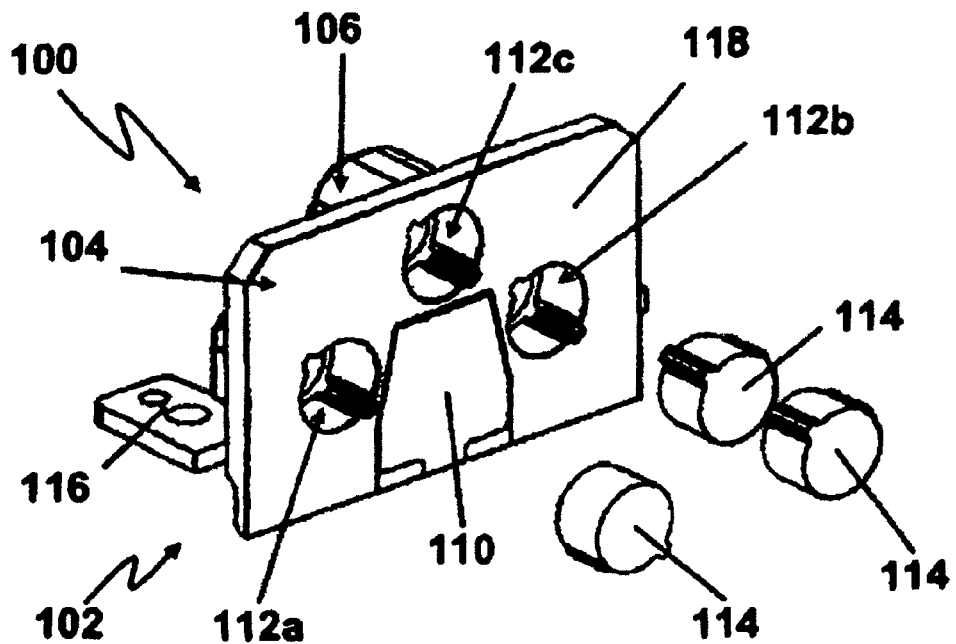
FIGS. 4A and 4B are front and rear perspective views of a housing assembly forming part of the interactive input system of FIG. 1.
Figure 4B:
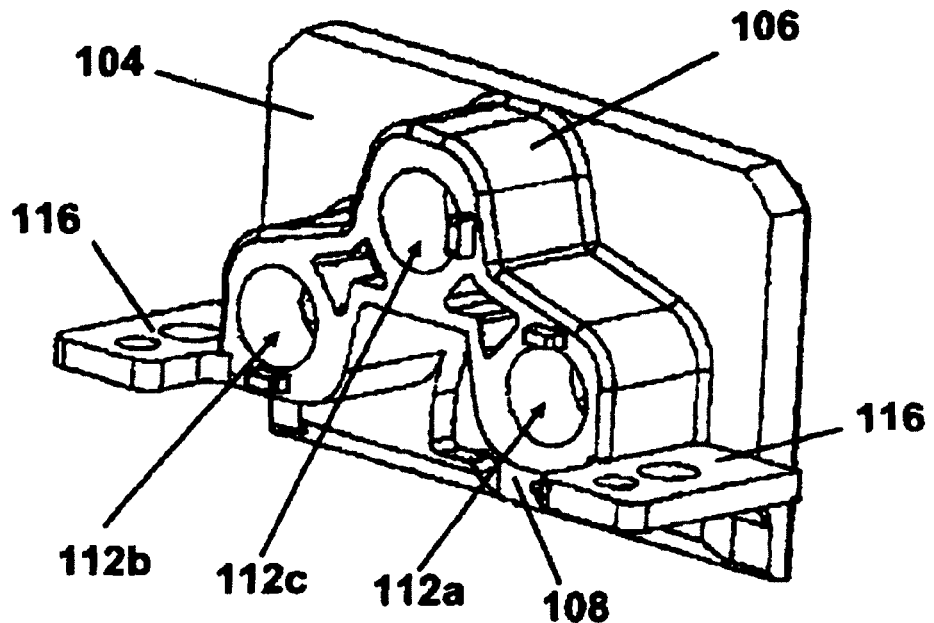

The image sensor 70 and its associated lens as well as the IR LEDs 84a to 84c are mounted on a housing assembly 100 that is best illustrated in FIGS. 4a and 4b. As can be seen, the housing assembly 100 comprises a polycarbonate housing body 102 having a front portion 104 and a rear portion 106 extending from the front portion. An imaging aperture 108 is centrally formed in the housing body 102 and accommodates an IR-pass/visible light blocking filter 110. The filter 110 has an IR-pass wavelength range of between about 830 nm and about 880 nm. The image sensor 70 and associated lens are positioned behind the filter 110 and oriented such that the field of view of the image sensor 70 looks through the filter 110 and generally across the interactive surface 24. The rear portion 106 is shaped to surround the image sensor 70. Three passages 112a to 112c are formed through the housing body 102. Passages 112a and 112b are positioned on opposite sides of the filter 110 and are in general horizontal alignment with the image sensor 70. Passage 112c is centrally positioned above the filter 110. Each tubular passage receives a light source socket 114 that is configured to receive a respective one of the IR LEDs 84. In particular, the socket 114 received in passage 112a accommodates IR LED 84a, the socket 114 received in passage 112b accommodates IR LED 84b, and the socket 114 received in passage 112c accommodates IR LED 84c. Mounting flanges 116 are provided on opposite sides of the rear portion 106 to facilitate connection of the housing assembly 100 to the bezel 26 via suitable fasteners. A label 118 formed of retro-reflective material overlies the front surface of the front portion 104. Further specifics concerning the housing assembly and its method of manufacture are described in U.S. application Ser. No. 12/709,419 to Liu et al. entitled "Housing Assembly for Interactive Input System and Fabrication Method" filed on Feb. 19, 2010, the content of which is incorporated herein by reference in its entirety.

Figure 5:
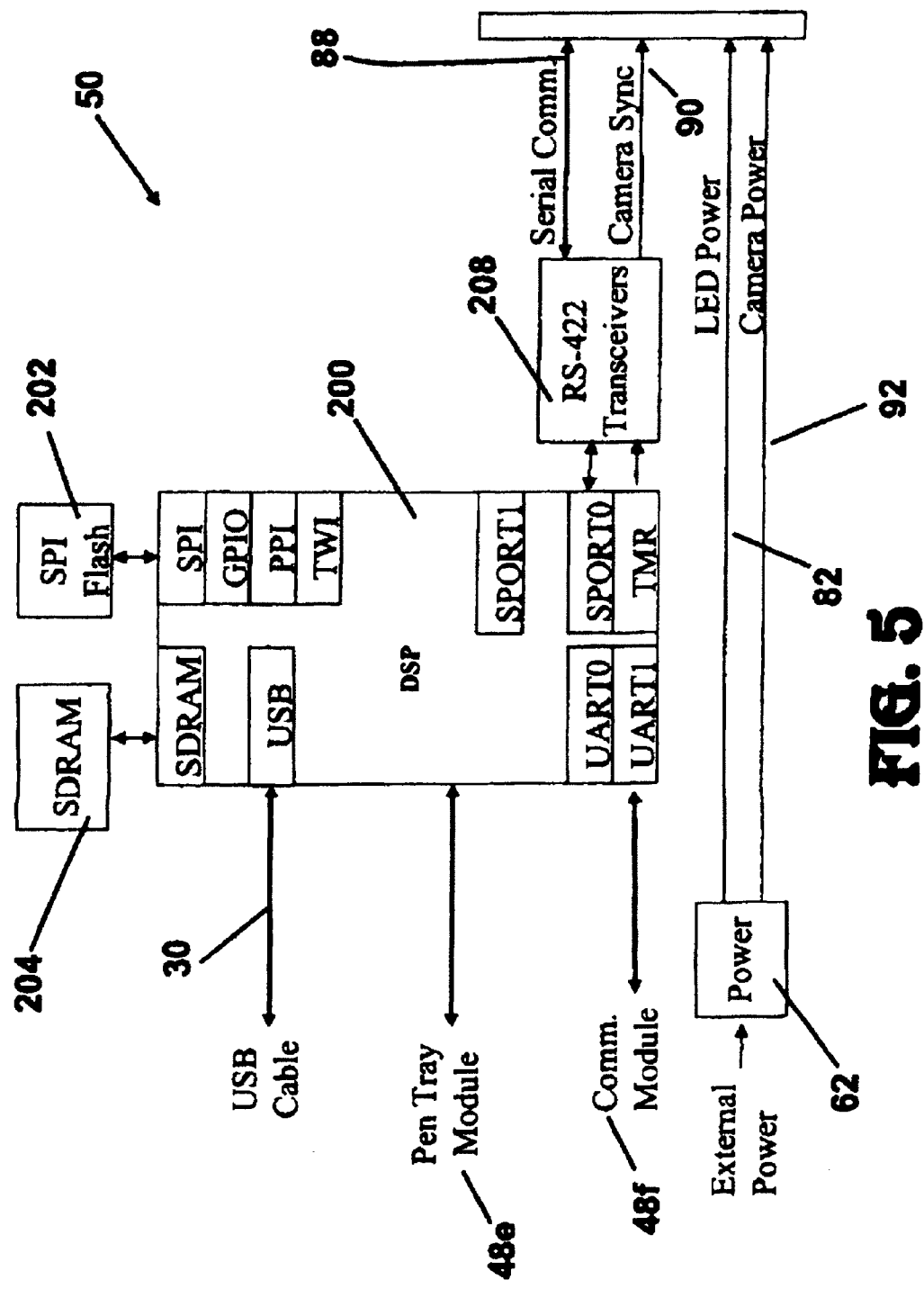
FIG. 5 is a block diagram of a master controller forming part of the interactive input system of FIG. 1.

The master controller 50 is better illustrated in FIG. 5. As can be seen, master controller 50 comprises a DSP 200 such as that manufactured by Analog Devices under part number ADSP-BF522 Blackfin or other suitable processing device. A serial peripheral interface (SPI) flash memory 202 is connected to the DSP 200 via an SPI port and stores the firmware required for master controller operation. A synchronous dynamic random access memory (SDRAM) 204 that stores temporary data necessary for system operation is connected to the DSP 200 via an SDRAM port. The DSP 200 communicates with the general purpose computing device 28 over the USB cable 30 via a USB port. The DSP 200 communicates through its serial port (SPORT) with the imaging assemblies 60 via an RS-422 transceiver 208 over the differential synchronous signal (DSS) communications link 88. In this embodiment, as more than one imaging assembly 60 communicates with the master controller DSP 200 over the DSS communications link 88, time division multiplexed (TDM) communications is employed. The DSP 200 also communicates with the imaging assemblies 60 via the RS-422 transceiver 208 over the camera synch line 90. DSP 200 communicates with the tool tray accessory module 48e over an inter-integrated circuit I²C channel and communicates with the communications accessory module 48f over universal asynchronous receiver/transmitter (UART), serial peripheral interface (SPI) and I²C channels.

As will be appreciated, the architectures of the imaging assemblies 60 and master controller 50 are similar. By providing a similar architecture between each imaging assembly 60 and the master controller 50, the same circuit board assembly and common components may be used for both thus reducing the part count and cost of the interactive input system 20. Differing components are added to the circuit board assemblies during manufacture dependent upon whether the circuit board assembly is intended for use in an imaging assembly 60 or in the master controller 50. For example, the master controller 50 may require a SDRAM 76 whereas the imaging assembly 60 may not.

The general purpose computing device 28 in this embodiment is a personal computer or other suitable processing device comprising, for example, a processing unit, system memory (volatile and/or non-volatile memory), other non-removable or removable memory (eg. a hard disk drive, RAM, ROM, EEPROM, CD-ROM, DVD, flash memory, etc.) and a system bus coupling the various computer components to the processing unit. The computer may also comprise a network connection to access shared or remote drives, one or more networked computers, or other networked devices.

During operation, the DSP 200 of the master controller 50 outputs synchronization signals that are applied to the synch line 90 via the transceiver 208. Each synchronization signal applied to the synch line 90 is received by the DSP 72 of each imaging assembly 60 via transceiver 86 and triggers a non-maskable interrupt (NMI) on the DSP 72. In response to the non-markable interrupt triggered by the synchronization signal, the DSP 72 of each imaging assembly 60 ensures that its local timers are within system tolerances and if not, corrects its local timers to match the master controller 50. Using one local timer, the DSP 72 initiates a pulse sequence via the snapshot line that is used to condition the image sensor to the snapshot mode and to control the integration period and frame rate of the image sensor 70 in the snapshot mode. The DSP 72 also initiates a second local timer that is used to provide output on the LED control line 174 so that the IR LEDs 84a to 84c are properly powered during the image frame capture cycle.

In response to the pulse sequence output on the snapshot line, the image sensor 70 of each imaging assembly 60 acquires image frames at the desired image frame rate. In this manner, image frames captured by the image sensor 70 of each imaging assembly can be referenced to the same point of time allowing the position of pointers brought into the fields of view of the image sensors 70 to be accurately triangulated. Also, by distributing the synchronization signals for the imaging assemblies 60, electromagnetic interference is minimized by reducing the need for transmitting a fast clock signal to each image assembly 60 from a central location. Instead, each imaging assembly 60 has its own local oscillator (not shown) and a lower frequency signal (e.g. the point rate, 120 Hz) is used to keep the image frame capture synchronized.

During image frame capture, the DSP 72 of each imaging assembly 60 also provides output to the strobe circuits 80 to control the switching of the IR LEDs 84a to 84c so that the IR LEDs are illuminated in a given sequence that is coordinated with the image frame capture sequence of each image sensor 70. In particular, in the sequence the first image frame is captured by the image sensor 70 when the IR LED 84c is fully illuminated in a high current mode and the other IR LEDs are off. The next image frame is captured when all of the IR LEDs 84a to 84c are off. Capturing these successive image frames with the IR LED 84c on and then off allows ambient light artifacts in captured image frames to be cancelled by generating difference image frames as described in U.S. Application Publication No. 2009/0278794 to McReynolds et al., assigned to SMART Technologies ULC, the content of which is incorporated herein by reference in its entirety. The third image frame is captured by the image sensor 70 when only the IR LED 84a is on and the fourth image frame is captured by the image sensor 70 when only the IR LED 84b is on. Capturing these image frames allows pointer edges and pointer shape to be determined as described in U.S. Provisional Application No. 61/294,832 to McGibney et al. entitled 'Interactive Input System and Illumination System Therefor' filed on Jan. 14, 2010, the content of which is incorporated herein by reference in its entirety. The strobe circuits 80 also control the IR LEDs 84a to 84c to inhibit blooming and to reduce the size of dark regions in captured image frames that are caused by the presence of other imaging assemblies 60 within the field of view of the image sensor 70 as will now be described.

During the image capture sequence, when each IR LED 84 is on, the IR LED floods the region of interest over the interactive surface 24 with infrared illumination. Infrared illumination that impinges on the retro-reflective bands of bezel segments 40, 42, 44 and 46 and on the retro-reflective labels 118 of the housing assemblies 100 is returned to the imaging assemblies 60. As a result, in the absence of a pointer, the image sensor 70 of each imaging assembly 60 sees a bright band having a substantially even intensity over its length together with any ambient light artifacts. When a pointer is brought into proximity with the interactive surface 24, the pointer occludes infrared illumination reflected by the retro-reflective bands of bezel segments 40, 42, 44 and 46 and/or the retro-reflective labels 118. As a result, the image sensor 70 of each imaging assembly 60 sees a dark region that interrupts the bright band in captured image frames. The reflections of the illuminated retro-reflective bands of bezel segments 40, 42, 44 and 46 and the illuminated retro-reflective labels 118 appearing on the interactive surface 24 are also visible to the image sensor 70.

Figure 6A:
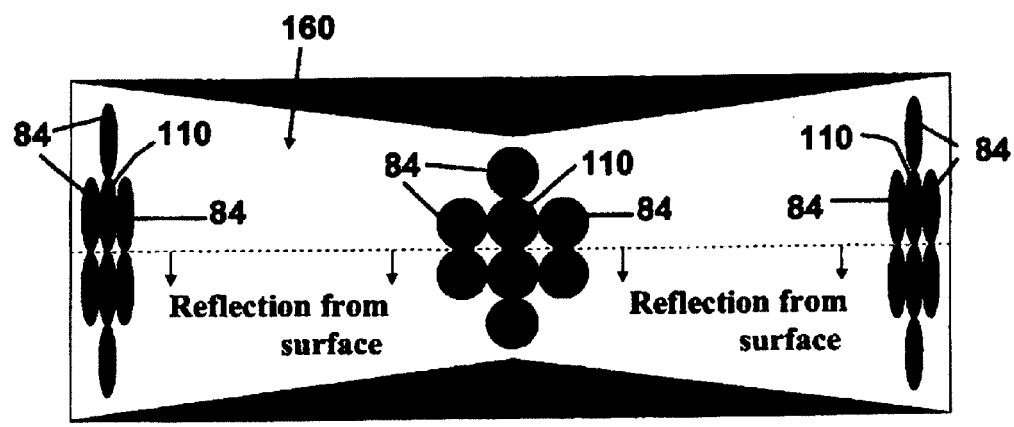
FIG. 6A is a simplified exemplary image frame captured by the imaging assembly of FIG. 3 when IR LEDs associated with other imaging assemblies of the interactive input system are in an off state.

FIG. 6A shows an exemplary image frame captured by the image sensor 70 of one of the imaging assemblies 60 when the IR LEDs 84 associated with the other imaging assemblies 60 are off during image frame capture. As can be seen, the IR LEDs 84a to 84c and the filter 110 of the other imaging assemblies 60 appear as dark regions that interrupt the bright band 159. These dark regions can be problematic as they can be inadvertently recognized as pointers.

Figure 6B:
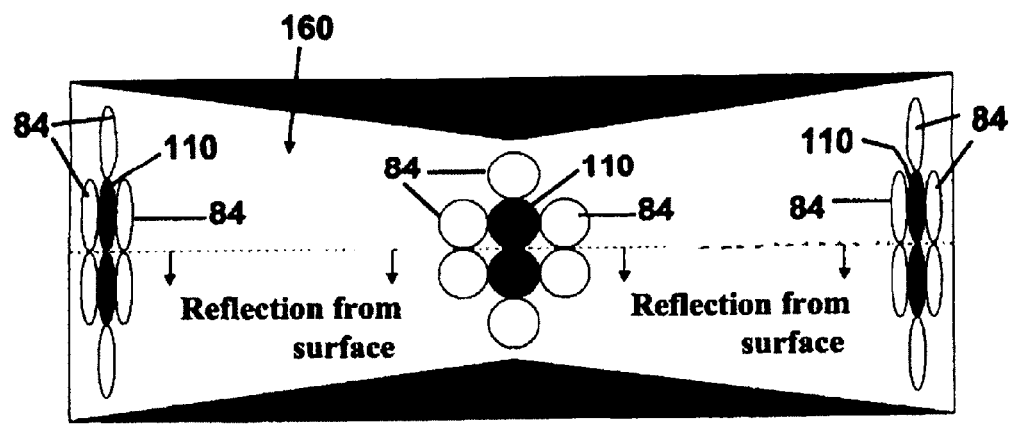
FIG. 6B is a simplified exemplary image frame captured by the imaging assembly of FIG. 3 when IR LEDs associated with other imaging assemblies of the interactive input system are in a low current state.

To address this problem, when the image sensor 70 of one of the imaging assemblies 60 is capturing an image frame, the strobe circuits 80 of the other imaging assemblies 60 are conditioned by the DSPs 72 to a low current mode. In the low current mode, the strobe circuits 80 control the operating power supplied to the IR LEDs 84a to 84c so that they emit infrared lighting at an intensity level that is substantially equal to the intensity of reflected illumination reflected by the retro-reflective bands on the bezel segments 40, 42, 44 and 46 and by the retro-reflective labels 118. FIG. 6B shows an exemplary image frame captured by the image sensor 70 of one of the imaging assemblies 60 when the IR LEDs 84a to 84c associated with the other imaging assemblies 60 are operated in the low current mode. As a result, the size of each dark region is reduced. Operating the IR LEDs 84a to 84c in this manner also inhibits blooming (i.e. saturation of image sensor pixels) which can occur if the IR LEDs 84a to 84c of the other imaging assemblies 60 are fully on during image frame capture. The required levels of brightness for the IR LEDs 84*a* to 84*c* in the low current mode are related to the distance between the image sensor 70 and the opposing bezel segments 40, 42, 44, and 46. Generally, lower levels of brightness are required as the distance between the image sensor 70 and the opposing bezel segments 40, 42, 44, and 46 increases due to the light loss within the air as well as inefficient distribution of light from each IR LED towards the bezel segments 40, 42, 44, and 46.

The sequence of image frames captured by the image sensor 70 of each imaging assembly 60 is processed by the DSP 72 to identify each pointer in each image frame and to obtain pointer shape and contact status information as described in above-incorporated U.S. Provisional Application Ser. No. 61/294,832 to McGibney et al. The DSP 72 of each imaging assembly 60 in turn conveys the pointer data representing the position of the pointer in the image frames as well as the pointer shape and contact status (actual contact or hover) to the DSP 200 of the master controller 50. The DSP 200 uses the pointer data received from the DSPs 72 to calculate the position of each pointer relative to the interactive surface 24 in (x,y) coordinates using well known triangulation as described in above-incorporated U.S. Pat. No. 6,803,906 to Morrison et al. The pointer coordinate data along with pointer shape and contact status is conveyed to the general purpose computing device 28 allowing the image data presented on the interactive surface 24 to be updated.

As mentioned above, the interactive input system 20 is able to detect passive pointers such as for example, a user's finger, a cylinder or other suitable object as well as pen tools P that are brought into proximity with the interactive surface 24 and within the fields of view of the imaging assemblies 60. Depending on the angle of the pointer as the pointer is brought into proximity with the interactive surface 24, difficulties may arise in distinguishing a pen tool P from a finger. To alleviate this problem, a pen tool with a unique reflective signature is used with the interactive input system 20 to allow the pen tool P to be distinguished from a finger irrespective of its orientation when brought into proximity with the interactive surface 24 as will now be described.

Turning now to FIGS. 7A to 7C, the pen tool P is illustrated. In this embodiment, pen tool P is passive and is configured to enable the interactive input system 20 to recognize the pen tool P irrespective of its angle when brought into proximity with the interactive surface 24. As can be seen, the pen tool P comprises a generally cylindrical body 200. A tip arrangement 202 is provided at one end 204 of the body 200. The tip arrangement 202 comprises a generally conical portion 206 and a nib 208 adjacent the narrow end of the conical portion 206. The diameter of the wide end of the conical portion 206 is less than the diameter of the body 200 thereby to define an annular end surface 210 on the body that surrounds the conical portion 206. Material having a highly reflective property such as for example retro-reflective material is provided on the outer side surface of body 200 adjacent the end 204 as well as on the annular end surface 210. The retro-reflective material on the body 200 is in the form of a continuous narrow band 212 that extends about the circumference of the body 200.

The positions of the retro-reflective band 212 on the body 200 and the retro-reflective material on the end surface 210 ensure that the retro-reflective material is visible to at least one of the imaging assemblies 60 when the pen tool P is brought into proximity with the interactive surface 24 and the imaging assemblies 60 are acquiring image frames in response to the pulse sequence output provided on their snapshot lines. The shapes of the retro-reflective material also produce a signature in captured image frames that is distinct from the signature in image frames produced by a finger. In particular, the retro-reflective material appears as bright regions or spots in image frames at locations where bright regions typically do not appear such as above the bright band representing the retro-reflective bands on the bezel segments 40, 42 and 44.

Figure 8:
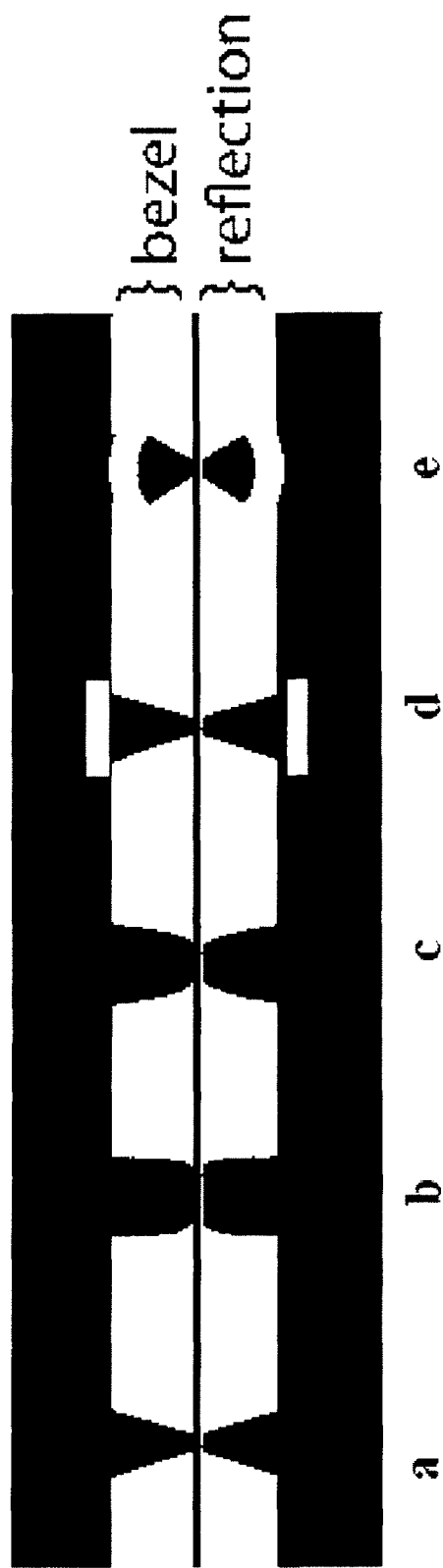
FIG. 8 is an exemplary image frame captured by the imaging assembly of FIG. 3 showing (a) a conventional pen tool oriented normal to the interactive surface of the interactive input system, (b) a finger oriented normal to the interactive surface, (c) the conventional pen tool angled away from the imaging assembly, (d) a pen tool having a unique reflective signature oriented normal to the interactive surface, and (e) the pen tool having the unique reflective signature angled away from the imaging assembly.

Turning now to FIG. 8, an exemplary image frame captured by one of the imaging assemblies 60 is illustrated showing different pointers in contact with the interactive surface 24 at different orientations. In case (a), a conventional pen tool without retro-reflective material adjacent its tip is in contact with and oriented normal to the interactive surface 24. In case (b), a finger is in contact with and oriented normal to the interactive surface 24. In case (c), the conventional pen tool is in contact with the interactive surface 24 but is angled away from the imaging assembly 60 that captured the image frame. As a result, the conventional pen tool resembles the finger of case (b) potentially leading to pointer disambiguity issues. In case (d), the pen tool P is in contact with and oriented normal to the interactive surface 24. As can be seen, the retro-reflective band 212 on the body 200 of the pen tool P is clearly visible above the bright band representing the retro-reflective bands on the bezel segments 40, 42 and 44. In case (e), the pen tool P is in contact with the interactive surface 24 but is angled away from the imaging assembly 60 that captured the image frame. As can be seen, in this orientation, the ring of retro-reflective material on the end surface 210 of the body 200 is visible in the image frame allowing the pen tool P to be recognized. In addition, the curvature of the bright band caused by the annular ring of retro-reflective material can be used to determine the angle of the pen tool P.

A pen tool/finger recognition procedure is therefore employed by each imaging assembly 60 to process captured image frames to detect the existence of the signature created by the pen tool P and allow the existence of the pen tool P to be verified. The manner by which the pen tool/finger recognition procedure processes image frames to detect the existence of the signature created by the pen tool P will now be described with particular reference to FIGS. 9A and 9B.

Figures 9A, 9B:
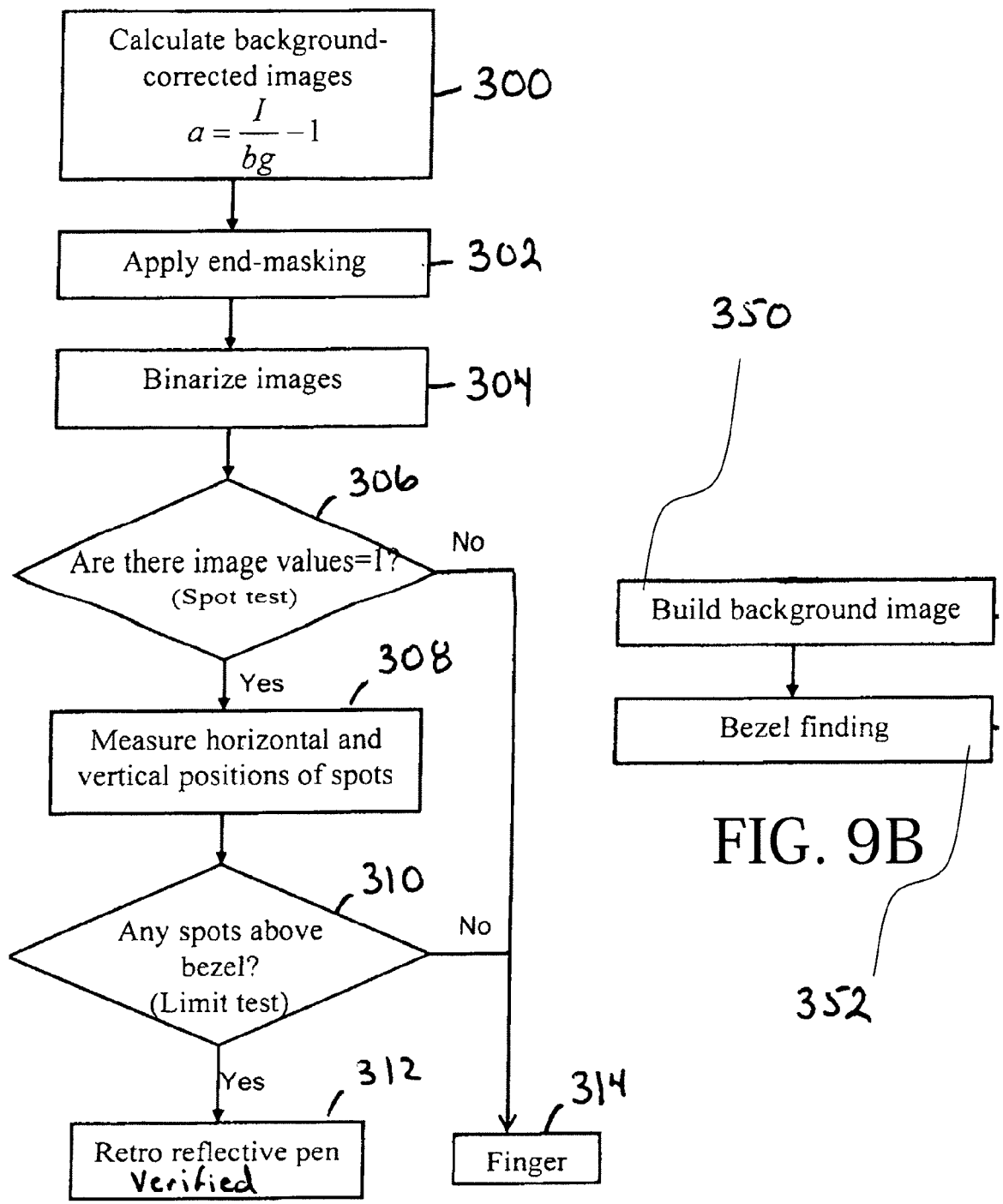
FIGS. 9A and 9B are flowcharts showing steps performed during a pent tool/finger recognition routine.

During the pen tool/finger recognition procedure, once an image frame has been captured, the image frame is divided by a background image frame that is created during a calibration routine performed for each imaging assembly 60 (see step 300 in FIG. 9A). During the calibration routine, in order to generate the background image frame, a plurality of image frames, in this example one-hundred (100) image frames, when no pointer is proximate the interactive surface 24 and with the IR LEDs 84*a* to 84*c* on, is captured and a mean background image frame is developed (see step 350 in FIG. 9B). The mean background image frame is then used to find the bright band in the mean background image frame that represents the retro-reflective bands on the bezel segments (step 352). During bezel finding, the visible limits of the bright band in the background image frame representing the retro-reflective bands on the bezel segments are determined and the dark or bright regions at opposite ends of the bright band are masked so that all pixel values in these regions of the background image frame are set to zero. The end masking can be performed manually or automatically.

Figure 10:
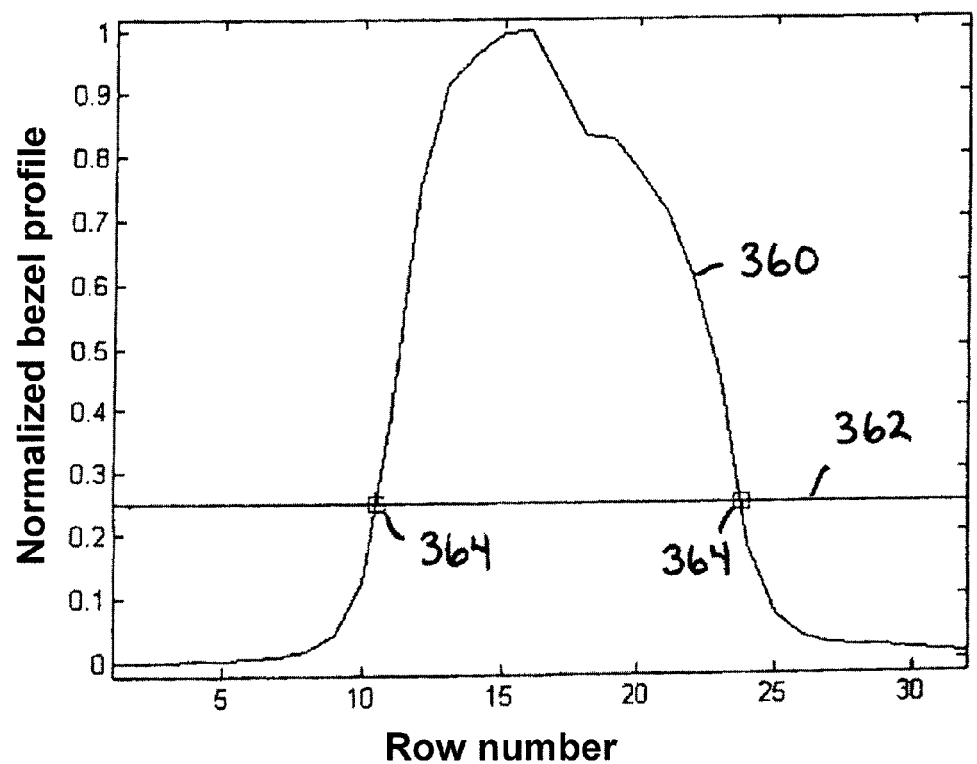
FIG. 10 shows a curve representing normalized image frame brightness across a bezel in a captured image frame.
Figure 11:
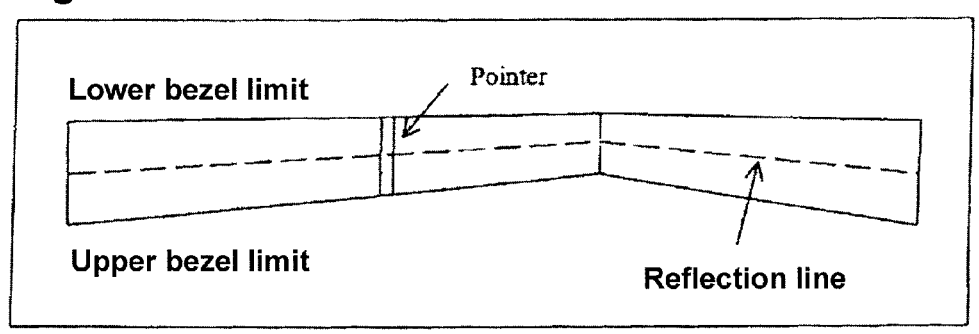
FIG. 11 shows determination of a reflection line.

Once the ends of the bright band in the mean background image frame have been masked, the upper and lower limits of the bright band and hence the bezel, at each column of the mean background image frame are determined. During this process, the brightness profile across the bright band in the mean background image frame at a given column is normalized to the range [0,1], and all pixels having a value above 0.25 are identified. The first and last pixels satisfying this criterion are taken to be the lower and upper bezel limits respectively (assuming that image row numbers increase from top to bottom). An example is shown in FIG. 10. In FIG. 10, the curve 360 represents the normalized image frame brightness across the bezel at a given image column. The line 362 is the threshold, and the squares 364 are the bezel limits at the corresponding column number. The mean of the upper and lower bezel limits at each column is then found, and this is adopted as a reflection line, i.e., the line in the mean background image frame at which the bezel is reflected in the interactive surface 24 as shown in FIG. 11.

As mentioned above, at step 300 each captured image frame is divided by the mean background image frame generated for the imaging assembly 60 that captured the image frame to generate a background-corrected image frame. Since the retro-reflective material on the pen tool P produces bright spots, the background-corrected image frame can be expressed as:

$$a = \frac{I}{bg} - 1$$

where a is the background-corrected image frame and bg is the mean background image frame.

If the background-corrected image frame has a dark background and if a pen tool P having retro-reflective material thereon is present in the background-corrected image frame, the retro-reflective material will appear as a bright feature in the background-corrected image frame. The background-corrected image frame is then end-masked (step 302) and the resulting reflection line is used to extract the center profile for the image frame which represents the pixels values of the image frame along the reflection line. This is a generalization of the concept of a vertical intensity profile. The center profile is normalized to the range [0,1] so that any time-dependent features in the background-corrected image frame appear as peaks on a near-zero or dark background (step 304). The center profile is used for detecting fingers in the background-corrected image frame as will be explained later.

Figure 12:
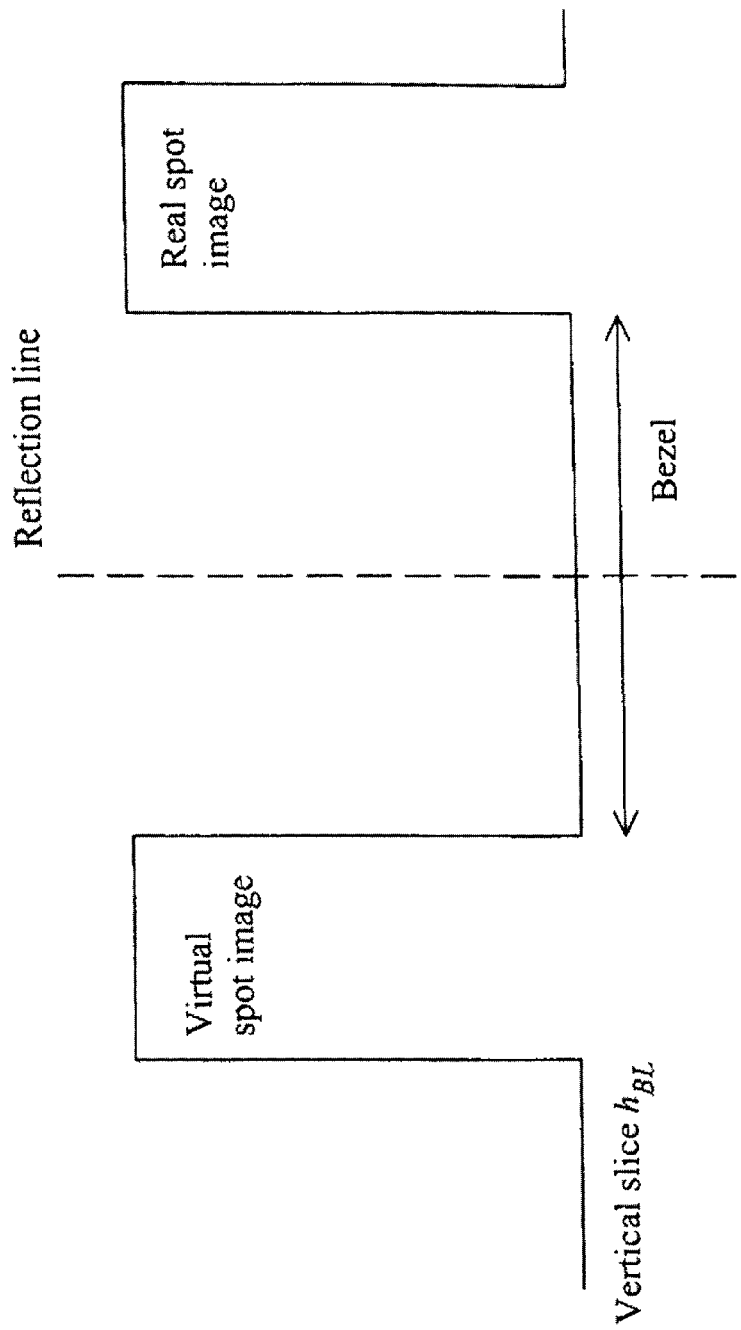
FIG. 12 illustrates a limit test.

In order to determine if a pen tool P is present in the background-corrected image frame, the background-corrected image frame is thresholded and a check is made to determine if any bright regions or "spots" exist in the thresholded background-corrected image frame (step 306). If the thresholded background-corrected image frame has bright regions or spots, a spot test is performed to verify the presence of a pen tool P (step 308). During the spot test, a conventional vertical intensity profile is used to find the approximate column positions of the spots in the thresholded background-corrected image frame. A limit test is then performed to determine if the spots are above or below the bezel limits at the approximate column positions (step 310). During the limit test, a vertical slice h through the thresholded background-corrected image is extracted. If the limit test holds true, then the presence of the pen tool P in the captured image frames is verified (step 312). The limit test is illustrated in FIG. 12. The solid curve is a vertical slice through an image frame, at the position of the pen tool.

The spot test allows the imaging assemblies 60 that see the pen tool P to be determined, and thus identifies the best imaging assemblies 60 that are available for triangulating the position of the pen tool. At step 306, if the spot test fails for all imaging assemblies 60, but the center profile generated by one or more of the imaging assemblies 60 shows a peak, then a finger in the captured image frames is verified (step 314).

As will be appreciated, the configuration of the retro-reflective material provided on the pen tool gives the pen tool a unique reflective signature at various angles relative to the interactive surface 24 while reducing the amount of retro-reflective material used and while maintaining contrast between at least a portion of the pen tool tip and the bright band representing the retro-reflective material on the bezel segments in captured image frames.

If desired, the IR light sources 82 can be modulated as described in U.S. patent application Ser. No. 12/118,521 to McReynolds et al. entitled "Interactive Input System with Controlled Lighting" filed concurrently herewith and assigned to SMART Technologies ULC of Calgary, Alberta, the content of which is incorporated by reference. In this manner, image frames for each imaging assembly based only on the contribution of illumination from its associated IR light source can be generated. The modulated signals output by the pen tool P can also be modulated.

Figure 13:
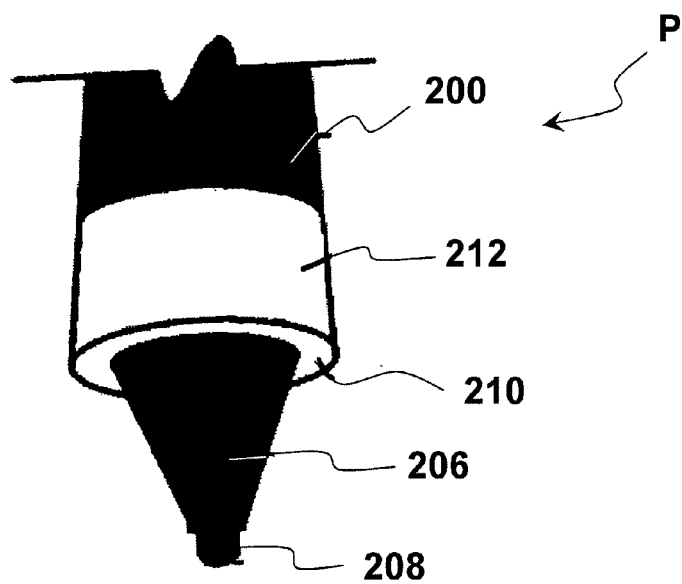
FIGS. 13 to 19b show alternative pen tools for use in the interactive input system of FIG. 1.
Figures 14A, 14B:
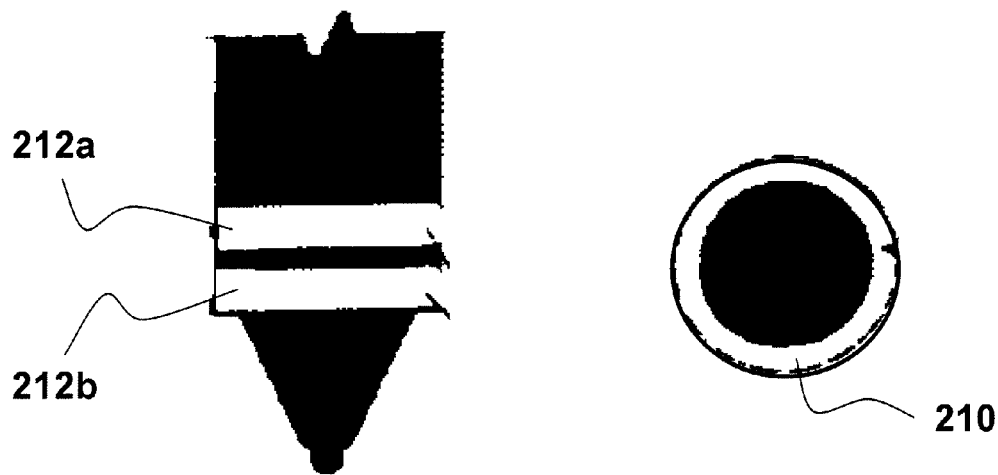
Figures 15A, 15B:
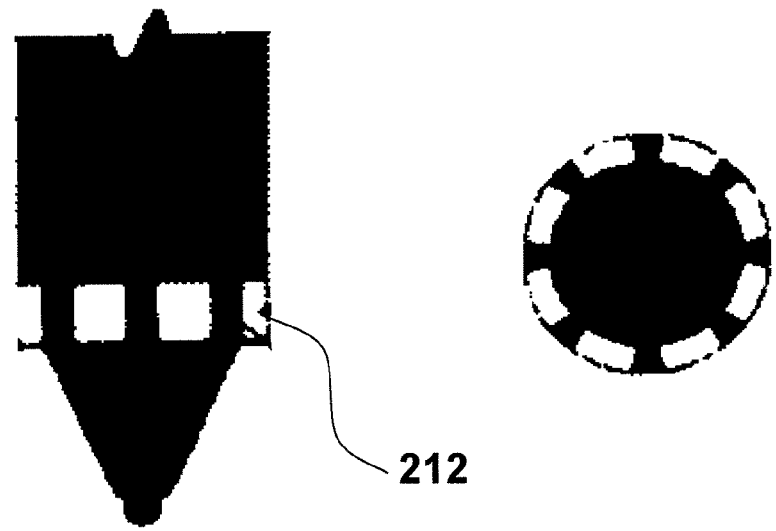

Although FIGS. 7A to 7C show one example of a pen tool P employing retro-reflective material that facilitates distinguishing between the pen tool P and a finger irrespective of the angle at which the pen tool P is brought into proximity with the interactive surface 24, alternative pen tool configurations are available. For example, FIG. 13 shows an alternative pen tool P. In this embodiment, the continuous retro-reflective band 212 that extends circumferentially around the body 200 adjacent the end surface 210 is thicker than that shown in the previous embodiment. FIGS. 14a and 14b show yet another pen tool P. In this embodiment, two vertically spaced, continuous retro-reflective bands 212a and 212b extend circumferentially around the body 200 adjacent the end surface 210. Of course more than two bands of retro-reflective material may be employed. FIGS. 15a and 15b show yet another pen tool P. In this embodiment, the retro-reflective band 212 is interrupted at one or more locations about the circumference of the body 200. Of course if more than one band of retro-reflective material is provided on the body, one or more of the bands may be interrupted. The retro-reflective material on the end surface 210 is also interrupted at circumferentially spaced locations.

Figures 16A, 16B:
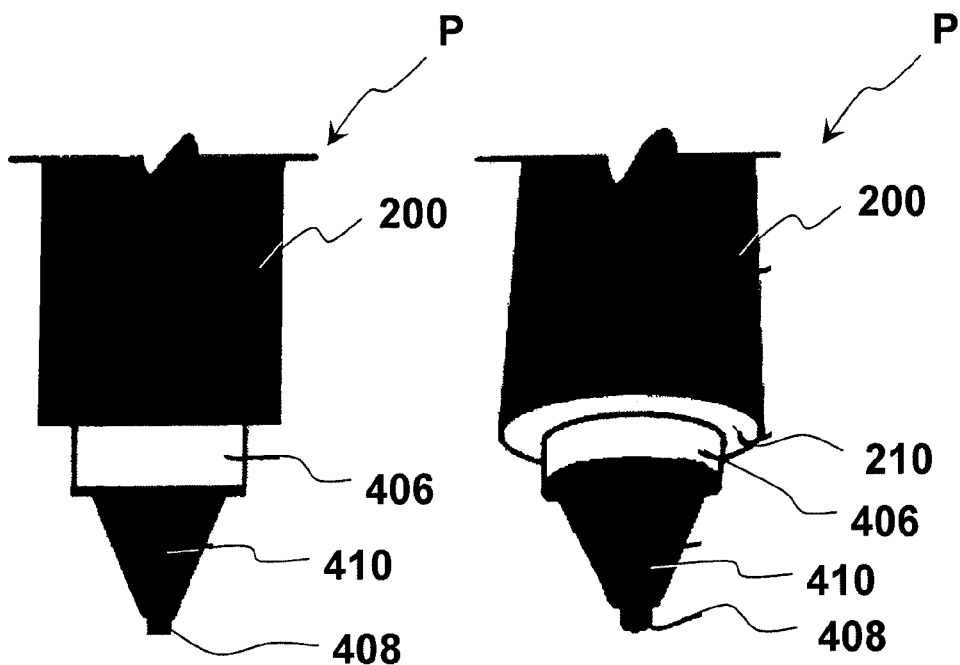
Figures 17A, 17B:
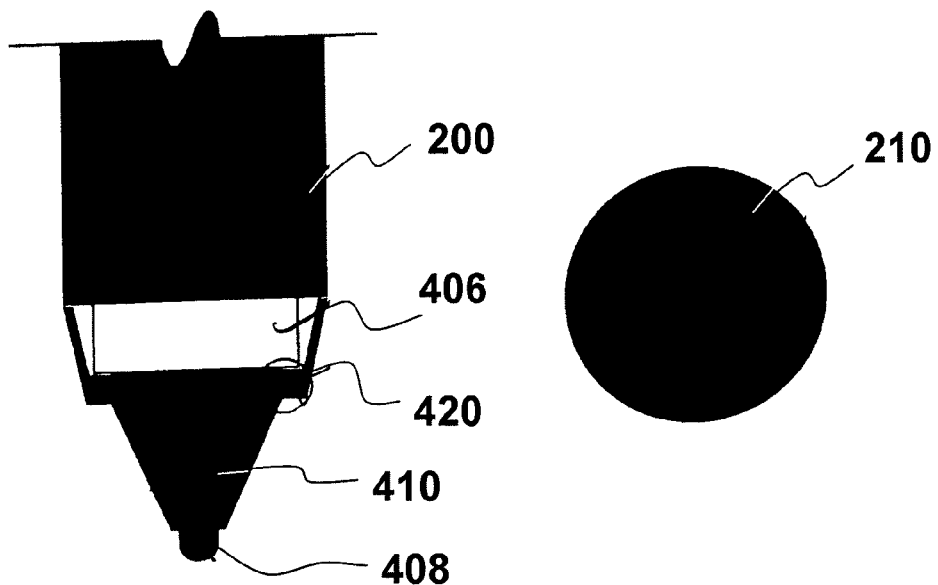
Figures 18A, 18B:
Figure 19A:
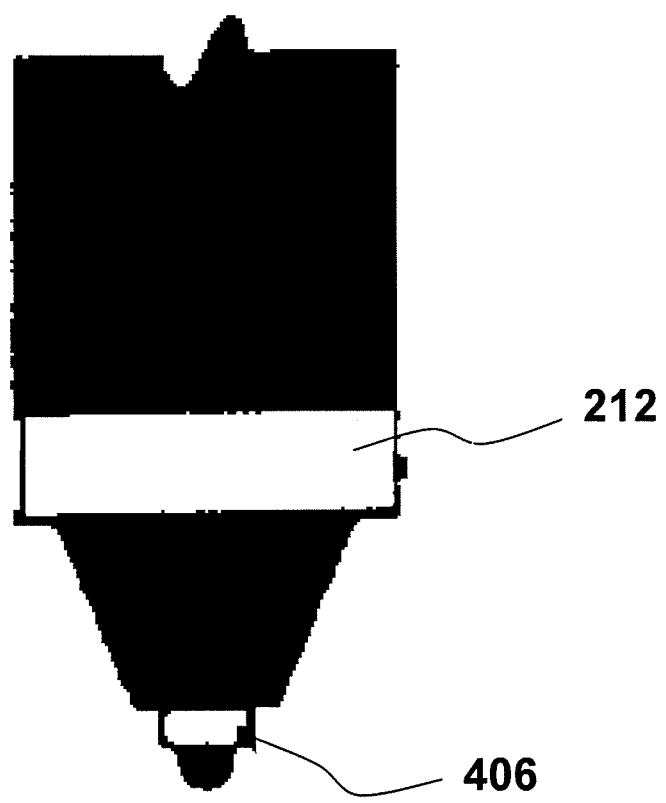
Figure 19B:
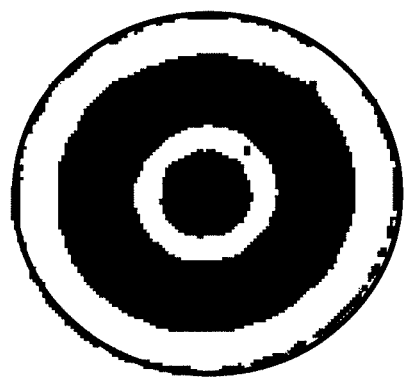

The tip arrangement 202 of the pen tool P may also take different configurations. As can be seen in FIGS. 16A and 16B, the tip arrangement 202 of the pen tool P comprise a generally cylindrical body portion 406 extending from the end surface 210 of the body 200 that is smaller in diameter than the diameter of the body 200. A generally conical body portion 410 extends from body portion 406 and a nib 408 is provided at the narrow end of the body portion 410. In this embodiment, the retro-reflective material is provided on the annular end surface 210 of the body 200 as well as on the cylindrical body portion 406 about its circumference. If desired, the cylindrical body portion 406 can be surrounded by a generally conical cover 420 formed of optically transparent material as shown in FIGS. 17A and 17B or by a generally cylindrical cover formed of optically transparent material as shown in FIGS. 18a and 18b to fill in the step between the body 200 and the body portion 406. Alternatively, the generally cylindrical body portion 406 of the tip arrangement 202 may be provided between the conical body portion and the nib as shown in FIGS. 19a and 19b. In this case, a retro-reflective band is provided around the body 200 adjacent the end surface 210 as well as around the body portion 406.

In the above embodiments, the pen tools P are described as having retro-reflective material thereon. Those of skill in the art will however appreciate that alternatives are available. For example, rather than employing retro-reflective material, highly reflective or luminescent material may be used. Alternatively, the pen tool P may comprise an active element such as for example an LED or other source that illuminates. If multiple pointers are used with the interactive input system, different patterns of retro-reflective material can be provided on different pen tools P to allow the different pen tools P to be differentiated and different attributes such as colour, line width etc. to be assigned to the pen tools.

Although reference is made primarily to pen tools, those of skill in the art will appreciate that the retro-reflective or other suitable material may also be applied to other types of tools such as an eraser tool. If one end of a tool is used for writing and the opposite end used for erasing, retro-reflective or other suitable material may be provided on the tool at both ends.

In the above embodiments, each bezel segment 40 to 44 is shown as comprising a single of band of retro-reflective material. Those of skill in the art will appreciate that the bezel segments may comprise bands having different reflective properties. For example, rather than using a retro-reflective band, a band formed of highly reflective material may be used. Alternatively, bezel segments comprising two or more bands with the bands having differing or alternating reflective properties may be used.

Although the imaging assemblies 60 are described as being accommodated by the corner pieces adjacent the bottom corners of the display surface, those of skill in the art will appreciate that the imaging assemblies may be placed at different locations relative to the display surface.

Those of skill in the art will appreciate that although the operation of the interactive input system 20 has been described with reference to a single pointer or pen tool P being positioned in proximity with the interactive surface 24, the interactive input system 20 is capable of detecting the existence of multiple pointers/pen tools that are proximate to the touch surface as each pointer appears in the image frames captured by the image sensors.

Although embodiments have been described with reference to the drawings, those of skill in the art will appreciate that variations and modifications may be made with departing from the spirit and scope thereof as defined by the appended claims.

What is claimed is:

1. A method of identifying a pointer having at least one retro-reflective band thereon in a machine vision interactive input system comprising a region of interest at least partially surrounded by a bezel and at least one imaging assembly having a field of view aimed into said region of interest, said method comprising:
capturing image frames that include said bezel;
processing the captured image frames to form background-corrected image frames and to determine upper and lower limits of said bezel;
performing threshold segmentation on the background-corrected image frames;
determining whether regions representative of a pointer exist in said background-corrected image frames; and
upon determining that regions representative of a pointer exist in said background-corrected image frames, performing a limit test to determine whether said regions are beyond the limits of the bezel and thereby identify a pointer having at least one retro-reflective band thereon.

2. The method of claim 1 wherein said processing comprises subtracting a background image frame from each captured image frame to form said background-corrected image frames.

3. The method of claim 2 wherein said processing further comprises masking regions of each background-corrected image frame beyond the upper and lower limits of said bezel.

4. The method of claim 3 wherein determining the upper and lower limits of said bezel is performed automatically.

5. An interactive input system comprising:
a region of interest at least partially surrounded by a bezel;
at least one imaging assembly having a field of view aimed into the region of interest and configured to capture image frames that include said bezel; and
processing structure configured to:
process said captured image frames to form background-corrected image frames and to determine upper and lower limits of said bezel;
perform threshold segmentation on the background-corrected image frames;
determine whether regions representative of a pointer exist in said background-corrected image frames; and
upon determining that regions representative of a pointer exist in said background-corrected image frames, perform a limit test to determine whether said regions are beyond the limits of the bezel and thereby identify a pointer having at least one retro-reflective band thereon.

6. The interactive input system of claim 5 wherein said processing structure, during processing, is configured to subtract a background image frame from each captured image frame to form said background-corrected image frames.

7. The interactive input system of claim 6 wherein said processing structure, after said subtracting, is configured to mask regions of each difference image frame beyond the upper and lower limits of said bezel.

8. A method of identifying a pointer having at least one retro-reflective band thereon adjacent a tip thereof in a machine vision interactive input system comprising a region of interest at least partially surrounded by a bezel and at least one imaging assembly having a field of view aimed into said region of interest, said method comprising:
capturing image frames that include said bezel;
subtracting a background image frame from each captured image frame to form background-corrected image frames;
identifying the upper and lower limits of said bezel in said image frames;
thresholding each background-corrected image frame;
determining whether regions representative of a pointer exist in said background-corrected image frames; and
upon determining that regions representative of a pointer exist in said background-corrected image frames, performing a limit test to determine whether said regions are beyond the limits of the bezel and thereby identify a pointer having at least one retro-reflective band thereon adjacent a tip thereof.

9. The method of claim 8 further comprising, after said identifying, masking regions of each background-corrected image frame beyond the upper and lower limits of said bezel.

10. A method of identifying a pointer having at least one retro-reflective band thereon adjacent a tip thereof in a machine vision interactive input system comprising a region of interest at least partially surrounded by a bezel and at least one imaging assembly having a field of view aimed into said region of interest, said method comprising:
capturing image frames that include said bezel;
processing the image frames to form background-corrected image frames;
identifying upper and lower limits of the bezel in said image frames;

thresholding said background-corrected image frames;

examining the thresholded background-corrected image frames to determine whether regions representative of a pointer exist therein; and when regions exist, performing a limit test to determine whether said regions are outside of the upper and lower limits of said bezel and thereby identify a pointer having at least one retro-reflective band thereon adjacent a tip thereof.

* * * * *